(12) United States Patent
Horrer et al.

(10) Patent No.: US 6,609,537 B1
(45) Date of Patent: Aug. 26, 2003

(54) DEVICE FOR VENTILATING AND VENTING A FUEL TANK

(75) Inventors: Hermann Horrer, Herrenberg (DE); Michael Koenig, Filderstadt-Harthausen (DE); Dieter Scheurenbrand, Wolfschlugen (DE); Timo Wiedel, Langenbrettach (DE)

(73) Assignee: DaimlerChrysler AG, Stuttgart (DE)

( * ) Notice: Subject to any disclaimer, the term of this patent is extended or adjusted under 35 U.S.C. 154(b) by 153 days.

(21) Appl. No.: 09/709,347

(22) Filed: Nov. 13, 2000

(30) Foreign Application Priority Data

Nov. 12, 1999 (DE) .......................................... 199 54 541

(51) Int. Cl.⁷ ............................................... F02M 33/02
(52) U.S. Cl. ................... 137/587; 137/43; 137/265; 123/509; 123/514
(58) Field of Search ................. 137/587, 265, 137/43; 123/514, 509

(56) References Cited

U.S. PATENT DOCUMENTS 5,078,169 A * 1/1992 Scheurenbrand et al.
5,392,804 A * 2/1995 Kondo et al. ................ 137/202
5,687,753 A * 11/1997 Doll ............................. 137/43
5,983,932 A * 11/1999 Wagner et al. .............. 137/587
6,029,635 A * 2/2000 Sekine et al. ................ 123/516
6,089,249 A * 7/2000 Thibaut et al. .............. 137/202

FOREIGN PATENT DOCUMENTS

| DE | 41 00 388 | 7/1992 |
| DE | 196 05 922 | 8/1996 |
| DE | 195 10 821 | 10/1996 |
| EP | 0943476 | 7/2000 |
| JP | 62-34818 | 2/1987 |

* cited by examiner

Primary Examiner—A. Michael Chambers
(74) Attorney, Agent, or Firm—Crowell & Moring LLP

(57) ABSTRACT

A device for ventilating and venting a fuel tank of a motor vehicle, has a ventilating device which compensates the pressure in the fuel tank, a separating container for separating fuel from a gas contained in the fuel tank. The operating ventilating device is connected to the separating container, the ventilating device and the separating container being arranged in the fuel tank.

15 Claims, 1 Drawing Sheet

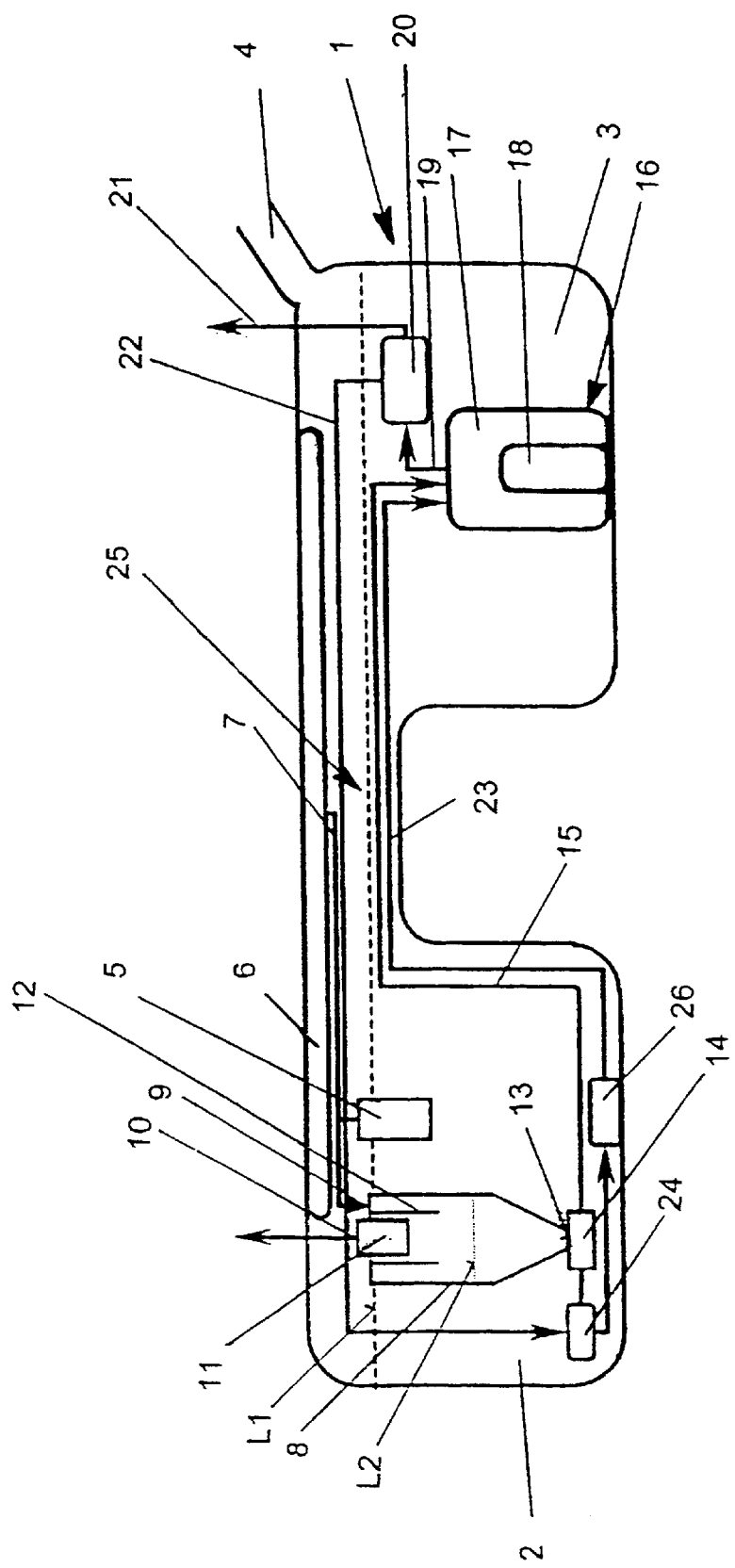

DEVICE FOR VENTILATING AND VENTING A FUEL TANK

BACKGROUND AND SUMMARY OF THE INVENTION

This application claims the priority of German Patent Document 199 54 541.3, filed in Germany, Nov. 12, 1999, the disclosure of which is expressly incorporated by reference herein.

The invention relates to a device for ventilating and venting a fuel tank of a motor vehicle, having a ventilating structure which compensates the pressure in a fuel tank.

In a fuel tank of a motor vehicle it is possible for gas contained in the fuel tank to be subjected to fluctuations in pressure, for example because of fluctuations in the temperature of the surroundings, the fluctuations in pressure requiring the pressure to be compensated. Furthermore, during the filling or emptying of the fuel tank, a positive pressure or, respectively, a negative pressure is produced which likewise has to be compensated. The pressure in the fuel tank is generally compensated by means of a device for ventilating and venting the fuel tank.

The devices known in practice for this conventionally have a vent which is arranged in the upper region of the fuel tank and is connected to a filter element, the filter element cleaning the gas flowing out of the fuel tank.

A problem with these devices is that during extreme driving or operating states, for example when cornering sharply, when driving uphill and downhill or when the vehicle is on its roof, for example in the case of an accident, the fuel level in the fuel tank rises in such a manner that it is possible for fuel to escape out of the fuel tank through the vent. The fuel is able to pass via the vent to the filter element and to impair or damage the functioning thereof. There is also the risk of fuel escaping from the fuel tank and contaminating the surroundings of the vehicle.

The fuel tanks which are conventionally used are preferably arranged in the underbody of the vehicle, for space reasons, and so fuel tanks having the lowest possible overall height and a large area are generally provided. In the case of fuel tanks designed in such a manner, the problem described above is further exacerbated, since the gas space formed above the fuel level is very low in these fuel tanks and so it is possible for fuel to escape through the vent even in the event of a small static or dynamic rise of the fuel level in the fuel tank.

In order to prevent the fuel from escaping from the fuel tank through the device for ventilating and venting, the device is provided in an additional container above the fuel tank which is connected to this container via a line. The fuel level in the fuel tank can therefore rise further without immediately reaching the vent. Particularly during extreme driving and operating states, an escape of fuel is therefore made more difficult because of the correspondingly higher position of the vent.

A device of this type is disclosed in German patent Document No. DE 196 05 922 A1. The device comprises an operating ventilating structure which is arranged in a container, is arranged above the fuel tank and is connected via a vent line to the fuel tank. The operating ventilating structure is also connected to a refuel-venting arrangement which is arranged in a filler neck of the fuel tank.

The operating ventilating structure which is arranged outside the fuel tank is connected via a connecting line to a filter element. The connecting line can be closed by a float valve. When the tank is filled to an appropriate level, a closing body which is connected to the float can be positioned in a sealing manner against a valve seat of the float valve, with the result that fuel is unable to escape through the connecting line to the filter element. After the fuel level has sunk again, the float of the valve is lowered again, thus enabling ventilation and venting of the fuel tank to take place.

In the case of the known device, in addition to the fuel tank, installation space for the device is required in order to arrange the latter together with the fuel tank on the vehicle. Because of the spatial separation of the fuel tank from the device for ventilating and venting, pre-assembly of the fuel tank or of the complete fuel system is made difficult or is impossible.

Moreover, connecting lines to the fuel tank and to other components, for example to the refuel-venting means, are required. As a result, a plurality of points of separation between the individual components which are connected to one another are necessary and these, like the components themselves, can cause emissions of fuel.

An object of the invention is to provide a device for ventilating and venting a fuel tank of a vehicle, the said device being further improved with regard to its ease of installation and with regard to possible emissions of fuel.

According to the invention, this object is achieved by a device for ventilating and venting a fuel tank of a motor vehicle, having a ventilating structure which compensates the pressure in a fuel tank, wherein a separating container for separating fuel from a gas contained in the fuel tank is provided, and wherein the ventilating structure is connected to the separating container, the ventilating structure and the separating container being arranged in the fuel tank.

The device according to the invention affords the advantage of emissions of fuel from the fuel tank being effectively prevented, since all of the components of the device, for example the ventilating structure, which can also include a refuel-limiting valve, and the separating container, are arranged within the fuel tank. In the device according to the invention, a connecting line between the separating container and the ventilating structure is also arranged in the fuel tank, with the result that possible leakages from the components of the device which are arranged within the fuel tank do not lead to the fuel escaping or to its emission into the environment.

The novel arrangement of the device in the fuel tank also has the advantage that the fuel tank or the entire fuel system having the device can be pre-assembled, which simplifies the final assembly with regard to working steps which arise.

In the device according to the invention, provision is made for the gas which is fed into the separating container from the ventilating structure and, for example, from a refuel-limiting valve, to be separated from the fuel which is transported with or entrained by it. This can be achieved by the entrained fuel being guided into the lower region of the separating container and by the gas being guided into the upper region of the separating container for the purpose of being conducted further to a filter element which cleans the gas.

The device according to the invention has just one connection to the filter element, which removes the gas from the fuel tank and feeds ambient air to the fuel tank. As a filter element, use can be made, for example, of an activated carbon filter arranged outside the fuel tank. Alternatively, the filter element could also be arranged in the fuel tank.

According to an advantageous development of the invention, a gas inlet and a gas outlet are provided in the separating container, these being arranged in the upper region of the separating container and being separated from each other by a splash guard. Because of the force of gravity, the fuel transported together with the gas is able to run or drip down along a wall of the separating container or along the splash guard to the lower region of the separating container and is able to be returned to the fuel tank by means of a fuel-removing device situated at this location. In contrast, the gas remains in the upper region of the separating container and is passed on via the gas outlet to the filter element.

Alternatively, it is also contemplated for other separating bodies, for example cyclones or the like, to be provided. However, the separating container has the advantage of being of a structurally simple design and therefore of being cost-effective.

The secure screening of the device according to the invention by the fuel tank facilitates the use of conventional, cost-effective components as valves in which a certain amount of leakage can be tolerated.

The use of the device according to the invention is particularly advantageous in the case of fuel tanks which are of flat construction because in this case the volume of gas above the fuel level is very low, and it is virtually impossible, without separating the fuel from the gas, to prevent fuel from passing into the filter element using a known device.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic view of a fuel system constructed according to a preferred embodiment of the invention.

DETAILED DESCRIPTION OF THE DRAWINGS

The single FIGURE of the drawing shows a schematic view of a fuel system with a fuel tank 1 of a motor vehicle, a ventilating structure 6 and a separating container 8 which is connected to the latter being arranged in the fuel tank 1.

In the exemplary embodiment illustrated in the drawing, the fuel tank 1 is a saddle-type tank which consists of two tank chambers 2, 3 which are connected to each other by means of a connecting web 25. The present invention may also be installed in other types of tanks.

The fuel tank 1 is filled with fuel, the maximum height of the fuel level being indicated by a dashed line L1. The fuel tank 1 is filled via a filler neck 4 which is coupled to a refuel-limiting valve 5 which controls the filling. The refuel-limiting valve 5 is generally designed as a float valve and, in the exemplary embodiment, is arranged in the first tank chamber 2.

Provided above the fuel level L1 is the operating ventilating structure 6 (illustrated symbolically) which, according to the invention, is connected via a gas line 7 to the separating container 8. The refuel-limiting valve 5 is also connected to the gas line 7. When there is an increase in pressure in the fuel tank 1, whether because of filling or an increase in temperature, a gas which is situated above the fuel level L1 in the interior of the fuel tank 1 passes to the separating container 8.

The separating container 8 is arranged in the first tank chamber 2 and is essentially of circular-cylindrical design, the lower region ending in a funnel shape.

A gas inlet 9 and a gas outlet 10 are provided on the upper region of the separating container 8. The gas line 7, which is connected to the ventilating structure 6 and to the refuel-limiting valve 5, opens into the gas inlet 9. The gas outlet 10 has a so-called roll-over float valve 11. The roll-over float valve 11 is a conventional float valve which prevents fuel from being able to escape from the separating container 8 when the motor vehicle corners sharply or is on its roof, as can occur, for example, in the case of an accident.

The gas inlet 9 and the gas outlet 10 of the separating container 8 are separated from each other by means of a splash guard 12. The splash guard 12 preferably has a circular cross section, the splash guard 12 surrounding the float of the roll-over float valve 11 and protruding downwards into the separating container 8.

The gas inlet 9 is arranged between the splash guard 12 and a wall of the separating container 8, so that the fuel which is carried along by means of the gas is passed downwards along the wall of the separating container 8. The splash guard 12 therefore prevents the fuel which is separated from the gas from passing to the roll-over float valve 11 and from there to the filter element.

In addition, a labyrinth may be provided between the float of the roll-over float valve 11 and the splash guard 12, the said labyrinth preventing fuel droplets which are entrained by the gas from passing the roll-over float valve 11.

The lower, funnel-shaped region of the separating container 8 can be filled with fuel, the maximum fuel level in the separating container 8 being indicated by a dotted line L2. It has emerged that it is an advantage for the separating container 8 to have an overall height which is as large as possible because the distance between the gas outlet 10 of the separating container 8 and the fuel level L2 in the separating container 8 is thereby increased.

Provided at the bottom of the separating container 8 is a fuel outlet 13 which is connected to a pump 14, preferably a suction jet pump or the like. It is advantageous if the funnel angle is smaller than 90° so that, even during extreme cornering of the motor vehicle, removal of fuel by means of the pump 14 is ensured at all times. Of course, other funnel angles may also be provided.

The pump 14 is connected via a line 15 to a fuel-conveying module 16 which is arranged in the second tank chamber 3 of the fuel tank 1. The fuel-conveying module 16 comprises a fuel pump 18 which is arranged in a reservoir 17. The fuel pump 18 is connected via a line 19 to a fuel filter 20. The fuel filter 20 is in turn connected to a fuel-feed line 21 which supplies the internal combustion engine of the motor vehicle with fuel. In addition, the fuel filter 20 is connected to a return line 22 which leads back into the first tank chamber 2.

Alternatively, a float valve may also be provided at the fuel outlet 13. When the fuel level in the fuel tank 1 is appropriately low, for example during cornering, the float valve opens the fuel outlet 13 and the fuel can flow out of the separating container 8 without the use of a pump. In this arrangement, it is advantageous for the separating container 8 to be arranged outwards as far as possible in the tank chamber 2 of the fuel tank 1, so that the separating container 8 can empty even during slight cornering with a sloping fuel level.

Provided parallel to the line 15 is a line 23 which is likewise connected to the fuel-conveying module 16. The line 23 is supplied by the return line 22 via a flow-regulating valve 24 and is likewise provided with a pump 26. The pump 26 is preferably a suction jet pump.

The fuel system illustrated in the drawing and having the device for ventilating and venting the fuel tank 1 operates in the manner described below.

The fuel tank 1 is filled via the filler neck 4, the fuel initially flowing into the tank chamber 3 until the latter is filled. The fuel then flows via the connecting web 25 into the tank chamber 2. When the maximum fuel level L1 is reached, the filling is interrupted via the refuel-limiting valve 5.

The gas displaced out of the tank chambers 2, 3 of the fuel tank 1 during the filling is conducted via the line 7 to the separating container 8, any fuel which is transported together with the gas being separated off in the separating container 8.

The ventilating structure 6 is likewise connected via the line 7 to the separating container 8. When the fuel level drops, for example due to consumption of fuel, it compensates the negative pressure then arising in the fuel tank 1 by feeding in ambient air via the separating container 8. When there is an increase in temperature, the positive pressure then arising in the fuel tank 1 is compensated by conducting gas into the separating container 8.

In the separating container 8, the gas entering through the gas inlet 9 is separated from the fuel by the splash guard 12 ensuring that the fuel is guided along the wall of the separating container 8 to the lower region of the separating container 8. The gas remains in the upper region of the separating container 8 and is conducted via the roll-over float valve 11 to the filter element. The filter element cleans the removed gas of impurities, with the result that the cleaned gas can then readily be emitted into the surroundings.

The pump 14 which is connected to the fuel outlet 13 ensures that the fuel level L2 in the separating container 8 is always kept small or low. The roll-over float valve 11 does not therefore come into contact with the fuel even during extreme cornering, and the escape of fuel from the fuel tank 1 is reliably prevented.

The fuel pumped out of the separating container 8 is conducted via the line 15 to the reservoir 17 of the fuel-conveying module 16. The fuel pump 18 conveys the fuel, preferably at a constant volume flow, via the fuel filter 20 to the fuel-feed line 21 which supplies the internal combustion engine of the motor vehicle with fuel. The pressure is regulated during this via a pressure regulator.

The return line 22 which is connected to the fuel filter 20 conducts the excess fuel back into the tank chamber 2 where it is fed to the pump 14 or to the pump 26 via the flow-regulating valve 24.

The flow-regulating valve 24 is, for example, a pressure-regulating valve which is intended to ensure a constant flow of fuel to the fuel-conveying module. When there is a rise in pressure upstream of one of the pumps 14, 26, the flow of fuel is appropriately diverted by the pressure-regulating valve.

The pump 26 conveys the fuel via the line 23, in the same manner as the pump 14 conveys it via the line 15, to the reservoir 17 of the fuel-conveying module 16 which feeds the fuel-feed line 21, which leads to the engine of the motor vehicle, with fuel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for ventilating and venting a fuel tank of a motor vehicle, having ventilating structure which compensates the pressure in a fuel tank via fluid communication with an outside of the fuel tank, wherein a separating container for separating fuel from a gas conveyed from the ventilating structure is provided, and wherein the ventilating structure is connected to the separating container by a gas line, the ventilating structure and the separating container being arranged in the fuel tank.

2. Device according to claim 1, wherein, in an upper region, the separating container has a gas inlet and a gas outlet which are separated from each other by way of a splash guard in such a manner that the fuel transported together with the gas passes into a lower region of the separating container where a fuel outlet is provided through which the fuel can be returned from the separating container to the fuel tank.

3. Device according to claim 2, wherein the gas inlet of the separating container is connected to the gas line which connects the separating container to the ventilating structure and to a refuel-limiting valve.

4. Device according to claim 3, wherein the gas outlet of the separating container has a roll-over float valve and is connected to a filter element.

5. Device according to claim 2, wherein the gas outlet of the separating container has a roll-over float valve and is connected to a filter element.

6. Device according to claim 2, wherein the fuel outlet has a float valve for regulating the removal of fuel from the separating container.

7. Device according to claim 2, wherein the fuel outlet is connected to a pump for conveying fuel out of the separating container.

8. Device according to claim 7, wherein the fuel outlet is connected via a line to a fuel-conveying module which supplies an engine with fuel.

9. Device according to claim 1, wherein the lower region of the separating container is of funnel-shaped design.

10. Device according to claim 1, wherein each pump which is arranged in the fuel tank can be controlled via a flow-regulating valve which regulates the flow of fuel.

11. Device according to claim 1, wherein the separated gas is operably conveyed to the outside via a gas outlet connected to the separating container.

12. A motor vehicle fuel system comprising:
   a fuel tank,
   a ventilating device operable to compensate for temperature induced pressure changes in the fuel tank via venting to an outside of the fuel tank, and
   a separating container operable to separate fuel from gas in the fuel tank,
   wherein the ventilating device is connected to the separating container by a gas line, and
   wherein the ventilating device and the separating container are both disposed inside the fuel tank.

13. A fuel system according to claim 12, wherein, in an upper region, the separating container has a gas inlet and a gas outlet which are separated from each other by way of a splash guard in such a manner that the fuel transported together with the gas passes into a lower region of the separating container where a fuel outlet is provided through which the fuel can be returned from the separating container to the fuel tank.

14. A fuel system according to claim 12, wherein the fuel tank is a saddle shaped tank with first and second tank chambers connected by a connecting web chamber.

15. A fuel system according to claim 14, wherein the separating container is disposed in the first tank chamber, and wherein the ventilating device extends above the tank chambers and the connecting web chambers.

\* \* \* \* \*